Feb. 10, 1931.  J. W. BRYCE  1,791,952
GROUP INDICATING SYSTEM FOR TABULATORS
Filed Sept. 28, 1927    7 Sheets-Sheet 1

Fig. 1.

Inventor
James W. Bryce
By his Attorney
W. M. Wilson

Feb. 10, 1931.   J. W. BRYCE   1,791,952
GROUP INDICATING SYSTEM FOR TABULATORS
Filed Sept. 28, 1927   7 Sheets-Sheet 2

Feb. 10, 1931.         J. W. BRYCE         1,791,952
GROUP INDICATING SYSTEM FOR TABULATORS
Filed Sept. 28, 1927     7 Sheets-Sheet 7

Inventor
James W. Bryce
By his Attorney
W. N. Wilson

Patented Feb. 10, 1931

1,791,952

UNITED STATES PATENT OFFICE

JAMES W. BRYCE, OF BLOOMFIELD, NEW JERSEY, ASSIGNOR TO THE TABULATING MACHINE COMPANY, OF ENDICOTT, NEW YORK, A CORPORATION OF NEW JERSEY

GROUP-INDICATING SYSTEM FOR TABULATORS

Application filed September 28, 1927. Serial No. 222,465.

The invention concerns a group indicating system for card controlled accounting machines and contemplates a simplified construction of the mechanical and electrical features of the system with improved and surer operation in all the functions which have hitherto been present in such systems together with additional features which are broadly new with the present invention.

Tabulating machines operate under control of perforated records or cards, the most common form of which have numerical data represented thereon by differentially located perforations. Ordinarily one figure is represented in a card column and each digit may be represented by one or a combination of perforations, the particular digit being fixed by the location of the perforation or perforations. Certain card columns are selected for the entry of items or amounts which are to be entered into the accumulating and printing mechanisms of the machine for addition and listing or total printing. Certain other card columns may be selected for the entry of classification data which for the sake of simplicity may also be assumed to be numerical data but which it is usually not desirable to add as it merely designates the class or type of the items or amounts which occur in other card columns. Thus under a certain accounting system for a sales office each salesman may be given an identification number. Then if a salesman identified by the number 254 for example makes a sale amounting to $105.00 a tabulating card may be prepared in which 254 is placed in certain columns hereinafter called group designating columns to identify the salesman and $105.00 is placed in other columns set aside to receive amounts of sales. Now at the end of an accounting period all cards bearing perforations representing 254 in their group designating columns may be assembled and run through a tabulating machine to accumulate or add the amount of sales thereon. The usual printing tabulator may print the total alone or may prepare an itemized list showing each item and the total. In either case it is desirable to print the group designating number in this case 254, in conjunction with the list or total. The group designating number may be printed in various ways. It may be printed opposite the first item only, or opposite the total only or opposite each item and total or opposite each item and not opposite the total. The present system contemplates the selective use of any of these printing schemes.

Several methods of printing the group designating data are in use. First the data may be entered into an accumulator from the first card of a group and held there until a total is printed when it may be read out and printed in the same way as a total. Also it may be printed directly from each card and entered in an accumulator from the first card of a group to be read out as a total during total taking. Either of these systems requires a sacrifice of counter or accumulating capacity as certain accumulators must be used for storing the group designating number. Also the group designating number may be printed from the first card and then not repeated or if an itemized list is being prepared it may be printed directly from each card opposite the item on each and omitted opposite the total.

The present invention concerns a group designation system in which no counter capacity is sacrificed and in which nevertheless the group number may be printed opposite each item and opposite the total if desired.

The invention further concerns a group designation system in which devices independent of the accumulators are provided for storing the group designating number indefinitely and furthermore such a system which may be used in connection with single perforation or combinational perforation cards.

The invention further contemplates that the group designating data may be read out of the storing device any number of times without destroying the setting of the device. Thus if an itemized list is being prepared the group number may be printed opposite each item and opposite the total if desired and the setting finally destroyed only after the total is printed.

The invention further contemplates that the set up representing a group number may be released or effaced at any time regardless of whether a total is printed or whether the tabulation on the group is finished.

The invention further contemplates that the set up of a designating number may be retained even after tabulating and/or totaling is completed and that the designating number may be printed or not at the time of total printing.

The invention further contemplates provisions for reading the group designating number out of the storing device at different angular speeds of the machine parts for printing. For example, the angular speed of the listing shaft during listing operations must be identical with that of the tabulating shaft and the movement of the printing mechanism during listing must conform to this relationship. During total printing on the other hand one revolution of a certain shaft may effect both total printing and resetting of the accumulators, a portion of the revolution effecting total printing and another portion reset. The storage device according to the invention is arranged to operate satisfactorily under both angular speed conditions.

The invention further contemplates a group designating system in which a group designating set up may be entered into a storing device independent of the accumulators during one machine cycle and the group designating number read out from the set up during a subsequent machine cycle.

Additional objects and advantages will be hereinafter pointed out as the description proceeds.

The general scheme of operation of the group designating or indicating system may be best understood by considering briefly the operation of the printing tabulator disclosed in the copending application of Lake, Serial No. 639,153, filed May 15, 1923. This tabulator is provided with upper or control brushes and lower or adding brushes which analyze each card in succession for the usual differentially located index points thereon. The controlling cards are sorted into groups prior to the tabulating operation and then passed through the tabulating machine in succession, that is the cards of a group follow each other successively until the group is exhausted and then the cards of the following group succeed each other in like manner. The upper and lower brushes analyze successive cards concurrently and cooperate to maintain the machine in operation as long as the group control perforations in successive cards agree. During this operation the data represented by perforations in the amount columns of the cards are automatically entered into the accumulating mechanism of the machine and added. When the last card of a group passes the lower brushes the first card of the succeeding group is under the upper brushes whereupon the group control perforations as analyzed by the upper and lower brushes fail to agree. Consequently the upper and lower brushes no longer properly cooperate to maintain the machine in accumulating operation and the machine may be arranged either to cease operation altogether or take a total from the accumulating mechanism. After the total taking operation, accumulating may be manually or automatically initiated on the following card group and the group control operation is repeated.

The group designating system according to what is at present believed to be the preferred form of the invention includes a commutator for each group designating card column which rotates synchronously with the card feed past the analyzing brushes of the machine. This commutator is hereinafter referred to as the reading-in commutator. It is provided with groups of contacts spaced about its periphery which are connected to the upper analyzing brush coacting with one of the group designating card columns and which successively pass under brushes coacting with the commutator surface as the analyzing brush searches the several successive index point positions. As a result a certain definite combination of circuits is energized through the commutator brushes for each index point designation on the card. The circuits each include a magnet and the magnets are consequently energized in combinations according to the group designating data in the particular card column.

A second set of commutator devices, hereafter referred to as the reading-out commutators, are provided with a combination of conducting spots on their peripheries and with shiftable brushes which may be shifted in predetermined combinations to coact with different combinations of the conducting spots during operation of the commutators. These brushes are under control of the magnets associated with the reading-in commutators and are shifted by them in accordance with the index points on the controlling records and when so shifted remain in their new position until positively restored. The conducting spots on the reading-out commutators are so arranged that when the shiftable brushes are set in accordance with a character on the controlling records a circuit will be closed momentarily through the commutators at the point in each machine cycle representing the character. Thus if the brush set up resulted from a 3 on the record, a current impulse occurs at the proper time to call the 3 type of the printing mechanism during each machine cycle, whether adding or totaling, as long as that particular brush set up remains. Thus the group indicating number may be stored indefinitely in the system. As will hereinafter be explained, when a number is thus stored in the system it may be printed whenever required by the chosen operation of the machine and as the brushes remain shifted until positively restored the number may be printed any number of times without destroying the setting.

Preferably two sets of reading-out commutator devices are provided for each reading-in commutator. As a card passes the upper analyzing brushes the reading-in commutator effects a setup on one of the reading-out commutator devices and the setup may be read out during the following machine cycle while the card is passing the lower analyzing brushes. During this following cycle the succeeding card passes the upper analyzing brushes and the reading-in commutator effects a setup on the other reading-out commutator device which setup may be read out during a subsequent machine cycle. During normal listing operations the reading-out commutator devices alternate in this fashion, being set up during one cycle and reading out during the following cycle while the other reading-out device is being set up. Normally each reading-out commutator device is reset at the end of its reading-out operation, but this sequence must be modified at the end of a card group when a total is taken. As the first card of a group reaches the upper brushes a setup of one reading-out commutator is effected and this setup is read out during the following machine cycle while the other reading-out commutator is being set under control of the following card of the group. As long as the card group does not change the group designation data remains the same and both reading-out commutator devices receive and hold the same settings. Thus each may be restored immediately after its reading-out operation. At the end of a card group the first card of a new group passes the upper brushes and sets up one of the reading-out devices according to the new group data. In this case the setups of both reading-out devices must be held over the total taking operation which follows the group change, the device setup with the old group data to read out when the total is taken and the device set up with the new group data to read out during the first tabulating cycle on the new group. The total taking mechanism is therefore provided with means to suppress restoring of the reading-out device during the last tabulating cycle of a group.

Also under certain conditions it may be desirable to enter a group designating setup into one of the reading-out devices and hold it there either with or without reading it out in the normal manner. To this end means is provided to suppress either the reading-out or the restoring operation at will so that the entered data may be read out at will with or without destroying the setting or so that the setup may be effaced at any time.

The invention may be clearly understood from the following detailed descripton which should be read in connection with the accompanying drawings in which an exemplary embodiment is illustrated chosen particularly to indicate the actual operation of a preferred form of the invention.

The general operation of the machine will first be briefly explained in connection with the circuit diagram in Figs. 7 and 7a. This diagram with the exception of the group indicating system is the same as that shown in the Lake application, Serial No. 639,153 to which reference may be had for a complete explanation of the mechanical and electrical operation of the machine. The present explanation will deal with the operation only to the extent necessary to a complete understanding of the group indicating system which forms the subject matter of the present invention. A stack of tabulating cards 20 is shown diagrammatically in position to be fed by suitable picker mechanism 22 to feed rolls 21 which are constantly rotated during tabulating cycles to feed the cards successively past upper brushes 23 and lower brushes 24 of the machine. Prior to initiating card feed it is necessary that the counters be cleared of any data which might have been entered into them from a previous machine operation and the machine is arranged to prevent institution of tabulating unless this reset operation is performed.

The machine circuits are energized from a suitable source of energy 25 which may be connected to lines 26 and 27 which serve to energize the machine circuits through a double pole switch 28. Assuming this switch to be closed the machine must first be sent through a reset cycle in order to clear its counters of any data which may be on them from a previous tabulating operation. Towards the end of this reset cycle, the contacts P—5 close to establish a circuit through the motor control relay magnet 29 extending from the line 26 through this magnet and stick relay 30 to contacts GI—10 and thence to cam contacts P—5 and the other side of the line 27. The contacts GI—10 closed during the reset cycle but open and remain open during the first tabulating cycle of each group. The energization of stick relay 30 closes a shunt around the contacts GI—10, the shunt including relay contacts 68 and cam contacts C—1. The cam contacts C—1 are in turn shunted by the automatic control circuit 65 so that after the reset cycle the relay magnet 29 remains energized as long as either C—1 or the automatic control circuit is closed. The energization of magnet 29 closes motor control relay contact 86 and these contacts being closed the tabulating motor TM which drives the picker mechanism, the feed rolls and the counter and printer mechanism for accumulating and listing, may be started into operation by closing the start key contacts ST whereupon a circuit is established from the line 26 through tabulator motor TM, card feed clutch magnet 35, motor relay 36 to start key contacts ST thence to contacts 86, emergency stop key S through cam contacts P—5 closed during tabulating, to the other side of the line 27. Shortly after the tabulating motor starts, the cam contacts T—1 close, shunting the start key ST and the motor relay contacts 86, out of circuit through the motor relay contacts 37, cam contacts T—1 and cam contacts P—5. When the first card feeds to the upper brushes, upper card lever contacts 40 are closed providing a second shunt extending from the closed contacts 37 of motor relay 36 through upper card lever contacts 40, motor control relay contacts 86 and emergency stop key contacts S to the cam contacts P—5. The cam contacts T—1 open once each cycle but as long as cards are passing under the upper brushes to hold the contacts 40 closed and as long as the motor control contacts 86 remain closed this opening of the contacts T—1 is ineffective to stop the motor. If during the operation of the machine the motor control relay contacts 86 open, the motor TM will stop at the end of the cycle shortly after the contacts T—1 open.

The energization of card feed clutch magnet 35 causes engagement of the usual one revolution card feed clutch connecting the feed rolls, card picker mechanism and accounting mechanism to the motor to cause their operation in synchronism with each other as long as the card feed clutch magnet is energized at the proper point in each cycle. When the motor stops, of course, the card feed clutch magnet is deenergized releasing the driving connection between the several mechanisms and the tabulating motor. When the first card of a group reaches the lower brushes lower card lever contacts 41 are closed connecting the lower brushes 24 to the line 27 during the adding portion of each card cycle. The brush circuit in this case extends from the line 27 through contacts P—5, closed during tabulating, to lower card lever contacts 41, thence through lower contacts P—4, closed during tabulating and wire 43 to contacts T—2 and T—3 thence through wire 44 to lower brushes 24. The cam contacts T—2 and T—3 open and close at the proper time to energize the lower brushes when that portion of the card which bears data to be accumulated is passing under the brushes and opens the circuit at other times. As each card passes under the lower brushes, its index point perforations close a circuit from the brushes 24 through cable connections 45 to triple sockets 46 on plug board 47A. Through these triple sockets the several brushes may be plugged to any of the counter magnets 47 to enter the items represented by the perforations into the accumulator wheels controlled by these magnets, the circuit extending from sockets 46 through plug connections to sockets 48 connected to the counter magnets 47 thence through contacts 49 to the line 26.

The energization of a counter magnet 47 opens the contacts 49 breaking its circuit to remove the spark from the brushes and closing listing contacts 50. The closure of these listing contacts establishes a circuit through an associated printing magnet 51 through cam contacts T—4, contacts 105 and wires 55 and 43 to the other line 27 through lower cam contacts P—4, card lever contacts 41 and cam contacts P—5. The impulse through the counter magnet 47 is correctly timed in the machine cycle to enter the proper number on the accumulator and the energization of the printing magnet 51 is timed to select the proper type for printing on the synchronously operating printing mechanism.

The operation of the accumulators and printers is fully described in the copending application and will not be described herein. It will be understood, however, that the accumulators are driven from a constantly rotating shaft to which each counter element is clutched when its counter magnet 47 is energized. All counter magnets which are connected to this shaft during a cycle are automatically unclutched by the operation of the machine at a predetermined point toward the end of the cycle. Owing to the differential location of the index points on the cards, the impulses through the counter magnets are timed to enter the number represented by the different index points on the accumulating element. During listing and tabulating cycles, the type carriers move through their several printing positions synchronously with the feed of cards past the brushes and when any printing magnet 51 is energized in consequence of the operation of its counter magnet 47 it is effective in selecting a printing type corresponding to the character represented by the index point on the card for printing.

The usual group control mechanism is indicated on the upper part of the switch board 47A and comprises group control magnets 56 with series contacts 57 and a plurality of automatic control contacts 58 of which one is associated with each group control magnet. One group control magnet 56 may be connected through sockets 59 and 60 with corresponding upper and lower brushes cooperating with each card column from which group control is to be effected. As long as the perforations in the selected columns of the cards under the upper and lower brushes agree, at some time during each card cycle a circuit will be established through each of the magnets 56 which are plugged in, the circuit extending from the line 26 through cam contacts T, upper brushes 23 and cable connections 61 to sockets 62 on plug board 47A thence through plug connections to sockets 59 connected to the magnets 56 and through sockets 60 of these magnets and plug connections to sockets 46 of the lower brushes and thence through cable 45 to lower brushes 24 and to the line 27 through the circuit previously traced. The energization of any magnet 56 causes its associated contacts 58 to close and remain closed until toward the end of the machine cycle when all such contacts which are closed are automatically opened. The contacts 58 which are associated with the magnets 56 plugged for group control are arranged in series in the automatic control circuit 65. The particular number of contacts 58 which are to be active is selected by means of a plug 66 which may be plugged into any of the sockets 67 connected to the contacts 58. The automatic control circuit 65 forms a shunt around a pair of contacts C—1 whose function will now be explained. It will be recalled that in order to maintain the machine in operation the motor control relay 29 must remain energized. When this relay is once energized a stick circuit is prepared for it through the contacts 68 of stick relay 30 extending through the cam contacts C—1 and to the other side of the line 27 through cam contacts P—5. The cam contacts C—1 open toward the end of each cycle and, unless the auto control circuit 65 is closed at this time, will effect deenergization of the motor control relay 29 to open its contacts 86 and stop the tabulating motor. As long as the control perforation in successive cards agree the control circuit 65 is closed at the time when the cam contacts C—1 open.

As soon as the control perforations on successive cards disagree, however, auto control circuit 65 fails to make and the opening of cam contacts C—1 toward the end of the cycle deenergized the motor control relay permitting its contacts 86 to open whereupon the tabulating motor and the card feed clutch magnet 35 are deenergized toward the end of the cycle by the opening of the cam contacts T—1. A total may then be taken by depressing the reset key R closing a circuit from the line 26 through the reset motor RM and reset clutch magnet 70 to contacts 71, open as long as the card feed clutch is engaged and closed when the card feed clutch is disengaged, thence through the reset key contacts R and cam contacts L—2 to the other side of the line 27. The energization of reset clutch magnet 70 closes contacts 75 forming a shunt about the reset key R. Shortly after the reset motor RM starts the cam contacts P—1 close shortcircuiting and deenergizing the reset clutch 70 and presenting a shunt about the clutch magnet 70 and contacts 75 for the motor RM. Toward the end of the cycle the cam contacts P—1 open interrupting the reset motor circuit and causing it to stop after a single cycle.

Figure 6:
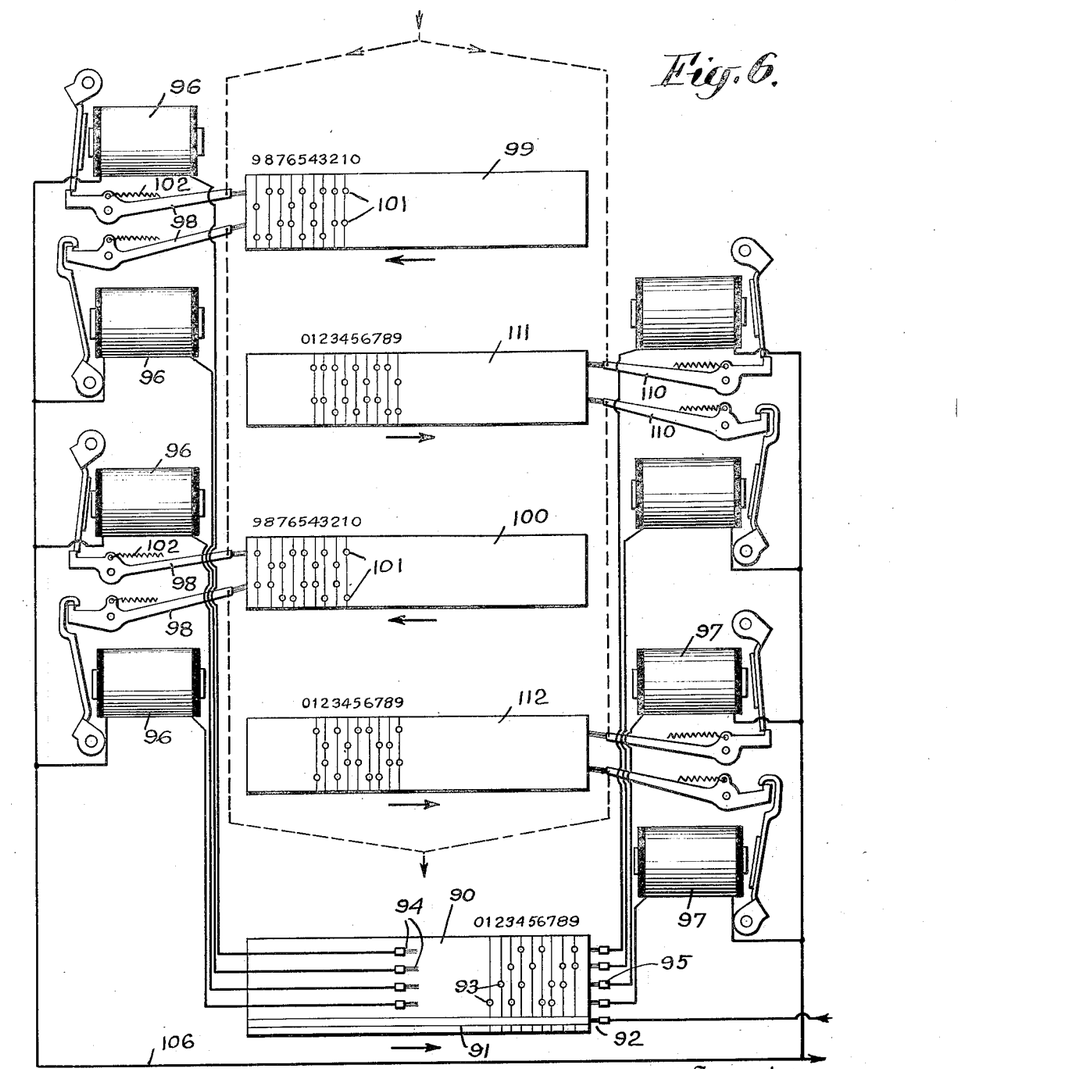
Fig. 6 is a diagrammatic view illustrating the method of reading in and reading out the group indicating numbers.

Before proceeding to the explanation of the cooperation of the group indicating system with the different machine circuits the general scheme of operation of the system will be explained in connection with the development diagram shown in Fig. 6. A common reading-in commutator is illustrated at 90 provided with a continuous conducting strip 91 and rotated in synchronism with the card feed in the direction of the arrow. A brush 92 cooperates with the conducting strip 91 and is connected to one of the upper brushes of the machine. The commutator 90 is provided with four circumferential rows of conducting points 93 which are also arranged in ten transverse rows corresponding to the positions to which impulses occur to enter the nine digits according to the Hollerith cycle. The conducting points in these transverse rows are connected together and to the conducting strip 91. Two sets of four brushes each shown at 94 and 95, cooperate with the four circumferential rows of contact points. Each brush 94 is connected to a magnet 96 while each brush 95 is individually connected to a magnet 97. The commutator 90 is geared to the driving mechanism of the machine with a two to one ratio so that during listing it makes one half a revolution for each machine cycle. During one machine cycle the conducting spots coact with the brushes 94 and during another cycle the conducting spots coact with the brushes 95. If in the present case the analyzing brush connected to the brush 92 encounters a perforation, a certain transverse row of conducting points 93 will be in engagement with the brushes 94 and one or two of the magnets 96 will be energized at this time. The magnets 96 control shiftable brushes 98 coacting with reading-out commutators 99 and 100. These commutators are likewise driven in synchronism with the machine making one half a revolution for each machine cycle. The commutators are each provided with four circumferential rows of conducting points 101 which are likewise arranged in nine transverse rows corresponding to the printing positions of the digits from one to nine during the printing cycle of the machine. Each transverse row in this case consists of two conducting points electrically connected together. Each brush 98 normally tends to coact with one circumferential row of spots 101 but may be shifted to coact with an adjacent row. When the magnets 96 are deenergized as shown in Fig. 6, the extreme upper shiftable brush 98 coacts with the upper row of spots 101 and the next lower brush 98 coacts with the third row of spots 101 on the commutator 99. Similarly the two lower brushes 98 cooperate with the upper and third row of conducting points 101 on the commutator 100. When any magnet 96 is energized its armature supporting structure is arranged to release the shiftable brush 98 to the action of a spring 102 whereby it is shifted to its alternative position.

The reading-out circuit illustrated in dotted lines, serves to select the proper printing type for printing. It will be noted that with the brushes in the normal position as shown in Fig. 6 no circuit can be completed through the brushes 98 as no combination of spots on the commutators 99 and 100 will close a circuit through these brushes as the commutators rotate. If the digit 7 is represented on a controlling card, the 7 perforation on reaching the analyzing brush will cause energization of the brush 92 and consequently the strip 91 at the time when the commutator 90 presents the seventh transverse row of contacting spots 93 to the brushes 94. At this time the circuit will be extended from the conducting strip 91 through the two lower brushes 94 and the two lower magnets 96 to energize these magnets and shift their corresponding brushes 98. When these brushes are once shifted, they remain shifted until positively restored. Now if the two lower brushes 98 are shifted, it will be noted that every time the commutators 99 and 100 present the transverse row designated 7 to the brushes 98, the dotted entering circuit will be closed. That is, for each alternate revolution of the commutators 99 and 100 an impulse will occur in the reading-out circuit at the proper time to select the 7 type for printing. In a similar manner a set up for any other figure which may occur on a controlling record will set up a combination of brushes 98 to effect a manifesting impulse for itself at the proper time in each cycle.

During alternate cycles the conducting spots 93 on the commutator 90 coact with brushes 95 to energize combinations of magnets 97 to shift brushes 110 coacting with reading-out commutators 111 and 112 which are similar to reading-out commutators 99 and 100 but have their conducting spots so located as to coact with the brushes 110 during the alternate cycles when the commutators 99 and 100 are inactive. After the mechanism has been set up then an impulse occurs from which the group indicating number may be printed.

Figure 1:
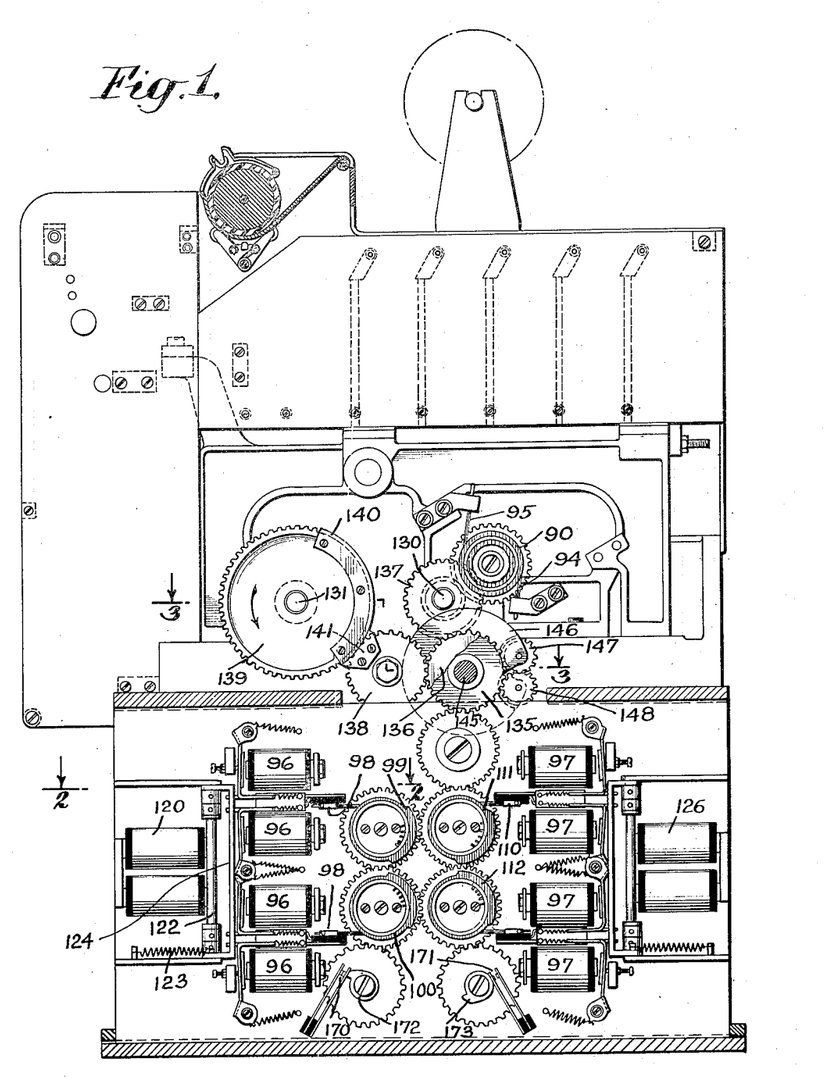
Fig. 1 shows a sectional view through a tabulating machine equipped with group indicating units according to the invention, the section being taken to illustrate a complete unit which operates from a single card column.
Figure 2:
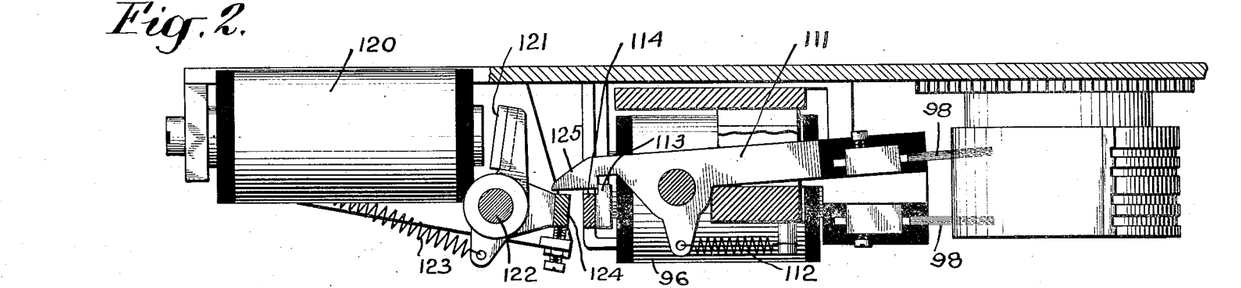
Fig. 2 is a section on line 2—2 of Fig. 1 illustrating particularly the operation of the restoring magnet.
Figure 5:
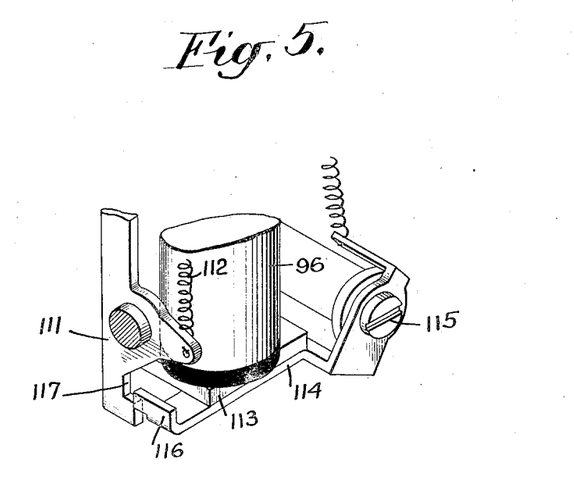
Fig. 5 is a detail illustrating the operation of the shiftable brushes by their operating magnets.

The operation of the magnets 96 in shifting the brushes 98 is illustrated in Figs. 2 and 5. The brushes 98 are each mounted on a pivoted lever 111 which is urged to a certain limiting position by a spring 112. The armature 113 of the magnet 96 is mounted on a supporting structure 114 pivoted at 115 and this supporting structure has an extension 116 which when the magnet is deenergized normally rests on the edge of a notch 117 in the lever 111 and holds this lever in an alternative position against the action of the spring 112. With the lever in the position shown in Fig. 5 the brush 98 is in its normal unshifted position. When the magnet is energized to attract its armature its supporting structure 114 rotates about point 115 and the extension 116 on the structure enters the notch 117 whereupon the spring 112 rotates the lever 111 to its alternative position to shift the brush 98. After the magnet 96 has been once energized the brush 98 remains shifted until positively restored. All the brushes 98 are restored by a common restoring magnet 120 (see also Fig. 1) whose armature 121 is fixed to a rotatable shaft 122 urged to the position shown in Fig. 2 by a spring 123. Also fixed to the shaft 122 is a bail 124 underlying extensions 125 on levers 111 which carry the brushes 98. When the restoring magnet 120 is energized it attracts its magnet 121 rotating the shaft 122 and rocking the bail 124 counterclockwise whereupon any lever 111 which is shifted will be restored to normal position and reengaged by the latching extension 116 of the armature structure of magnets 96 to hold it in restored position. The brushes 110 are restored by similar mechanism including a restoring magnet 126 (see Fig. 1).

Referring again to Figs. 7 and 7a, each reading-in commutator 90 is plugged to upper brush 23 through socket connections 155 and 62. The cards passing the upper brushes 23 alternately energize the magnets 96 and 97 according to the index points on successive cards, that is the first card of a group energizes a combination of magnets 96, the following cards energize a group of magnets 97 and so on. The magnets 96 shift the brushes of commutators 99 and 100 and the brushes 97 shift the brushes of the commutators 111 or 112. A pair of commutators 99 and 100 are connected in multiple with a pair of commutators 111 and 112 and the multiple connection through sockets 157 is plugged to suitable printing magnets 158 for printing the group indicating or designating numbers. The shiftable brushes of the commutators 99 and 100 are shifted while the card is under the upper brushes 23 but the brushes do not coact with the conducting spots 101 until the following machine cycle when the card which caused the setup is passing the lower brushes 24. The printing magnets 158 then will be controlled according to the group designating number while the amounts on the card which cause the setup are being entered into the listing and printing mechanism from the lower analyzing brushes 24. Also while the commutators 99 and 100 are thus reading out the brushes of commutators 111 and 112 are being set up from the following card then under the upper brushes 23 through commutator 90 and brushes 97.

As long as the card group does not change the shiftable brushes of commutators 99, 100, 111 and 112 are restored at the end of the cycle in which they read out. The restoring magnet 120 for the brushes 98 of commutators 99 and 100 is connected to line 26 through a manually operable switch 160 and the circuit is continued through a cam contact 170 to a point 190 where the circuit branches, one branch extending through listing cam contacts L—6 and relay contacts 174 to cam contacts P—6 and the other branch extending from point 190 through cam contacts P—15. The restoring magnet 126 for the brushes 110 of the commutators 111 and 112 is controlled from a similar circuit which extends through cam contacts 171. The contacts 170 and 171 are controlled from cams driven by the commutator mechanism and are arranged to close in alternate machine cycles, that is contacts 170 close during one machine cycle and contacts 171 close during the following machine cycle, while contacts 170 remain open. The cam contact P—15 remains open during listing or tabulating cycle and the contacts 174 are operated by a relay coil 173 in series with a motor control relay 29. As long as the motor control relay magnet circuit remains energized, in other words as long as the card group does not change, the magnet 173 remains energized and holds the contacts 174 closed. The cam contacts L—6 are controlled from the listing shaft and close once each machine cycle after the reading-out operation from the reading-out commutators is completed. It will thus be clear that during listing cycles on a group the restoring magnets 120 and 126 will be energized to restore the shiftable brushes of the reading-out commutators directly after they have controlled the group indicating printing magnets.

Briefly summarizing this operation then, a card when passing the upper brushes 23 sets up the shiftable brushes of the reading-out commutators and the entered reading is read out during the following cycle while the card is being analyzed by the lower brushes 24 for amount data thereon. At the end of this reading-out cycle the shiftable brushes of the reading-out commutators are restored to normal. The two sets of reading-out commutators alternate to handle successive cards, this operation continuing as long as the card group does not change.

A change in card group as previously explained causes the machine to cease tabulating to permit a total to be taken. It is usually desirable to print the group indicating number of the old group opposite the total and to print the group indicating number of the new group opposite the first item of the new group on the record sheet. As the first card of the new group feeds past the upper brushes 23 the new group data controls the setting of the shiftable brushes of one of the reading-out commutators while the other reading-out commutator is still set for the data of the last card of the previous group, this data having just been printed opposite the last item of the old group. In this case both settings should be held over the total taking operation and the normal restoring circuit for magnets 120 and 126 is interrupted by the opening of the contacts 174, the coil 173 controlling these contacts being deenergized by the opening of the automatic control circuit owing to failure of the cards under the upper and lower brushes to agree in controlling perforations. The closure of the cam contacts L—6 in the last listing cycle of the group then is ineffective to reset either of the reading-out devices.

When the total is taken the reading-out commutator which has just controlled group printing during the last listing cycle of the old card group must again control group designating printing for the total. Referring to Fig. 6 for an instant, it will be noted that after the printing control operation of the reading-out devices the shiftable brushes ride on the blank surface of the reading-out commutators for substantially half a revolution and consequently the reading-out commutators must be given an extra half turn to again bring the contact points 101 under the shiftable brushes to control group printing for the total. The translator mechanism is driven for this operation as will be hereinafter explained, from the total print shaft of the machine which rotates to take the total and thereafter reset the accumulators. The total taking operation in the present case is delayed until the second third of the revolution of the total print shaft when the reading-out commutator holding the reading of the old group has come into proper position to read out for the total taking operation. During this second third of the revolution of the total print shaft the total is taken and the group designating number is read out of the reading-out commutator and during the last third of the revolution counter reset is effected.

Figure 8:
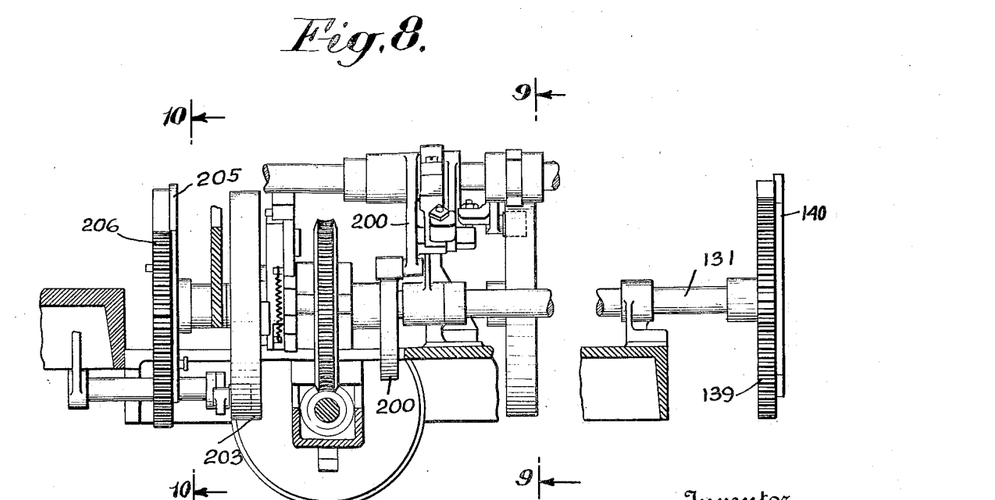
Figs. 8, 9, and 10 are fragmentary details of the printing and resetting mechanism as modified to conform to the present invention, Figs. 9 and 10 being sections on line 9—9 and 10—10, respectively, of Fig. 8.
Figure 9:
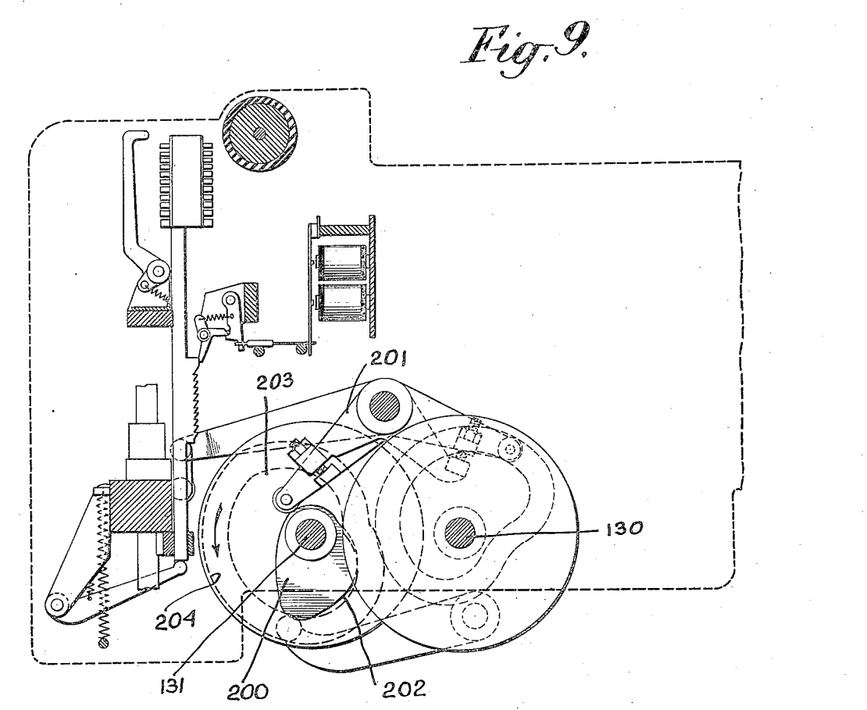
Figure 10:
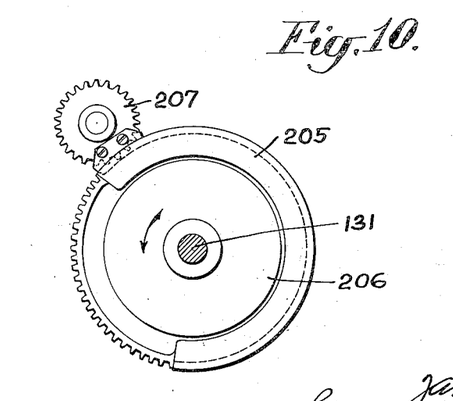

The total printing mechanism for the machine to which the invention is applied is fully illustrated and described in copending application of Lake, No. 639,153 referred to above. Normally the reset motor RM drives the total print shaft through a single revolution, during the first half of which the type bars rise and are selected for printing under control of the accumulators and during the second half of which the accumulator elements are reset or restored to zero. The method of rearranging the total taking cycle to delay total printing until the reading-out commutator is in position to control group designation printing is indicated in Figs. 8, 9 and 10. The total print shaft 131, driven from the reset motor through a suitable one revolution clutch, carries a cam 200 for raising the type bar during total printing, a second cam 203 for effecting rocking of the usual total printing control fingers, for picking the total out of the accumulators, and a Geneva motion gear for locking the accumulator reset shaft against motion during the total printing portion of the cycle and driving it from the total print shaft during the reset portion of the cycle. In the present case the design of the type carrier raising cam, the cam for rocking the total taking fingers and the Geneva motion has been modified to delay total printing until the group designation reading-out commutator is in position to read out. The cam 200 for raising the type bars is provided with a concentric portion which coacts with the type raising arm 201 during the first third of the revolution of the total print shaft 131. During the second third of the revolution the cam raises and lowers the type bars through its raised portion 202 and during the third portion of the revolution the arm 201 again coacts with the concentric portion to hold the type carriers stationary. The box cam 203 which effects rocking of the usual total taking fingers likewise has its cam groove 204 designed so that the total taking fingers are stationary during the first third of the revolution of the total print shaft and are rocked in the usual manner to take the total during the second third of the revolution. The plate 205 on the Geneva gear which locks the reset shaft during the total taking portion of the cycle extends about two thirds of the periphery of the reset driving gear 206 instead of one half of the periphery as formally so that the reset shaft in the present case is stationary during the first two thirds revolution of the total print shaft and is driven only during the last third of the cycle. The gearing between the gear 207 on the reset shaft and the driving gear 206 is such that during this last third revolution of the total print shaft the reset shaft makes a complete revolution to restore the counters to zero.

Figure 7:
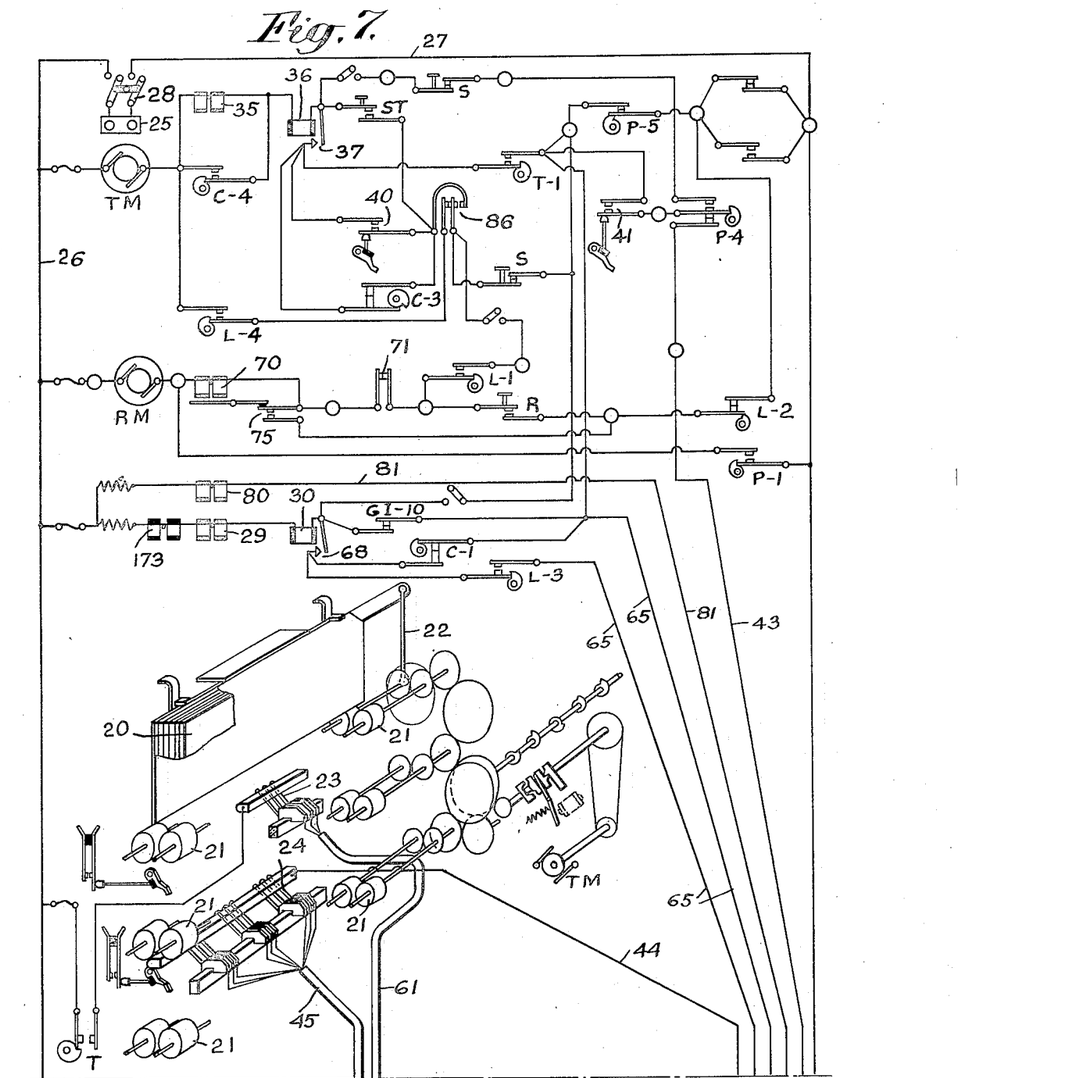
Figs. 7 and 7a together form a complete circuit diagram of a tabulator equipped with group indicating mechanism according to the invention.
Figure 7A:
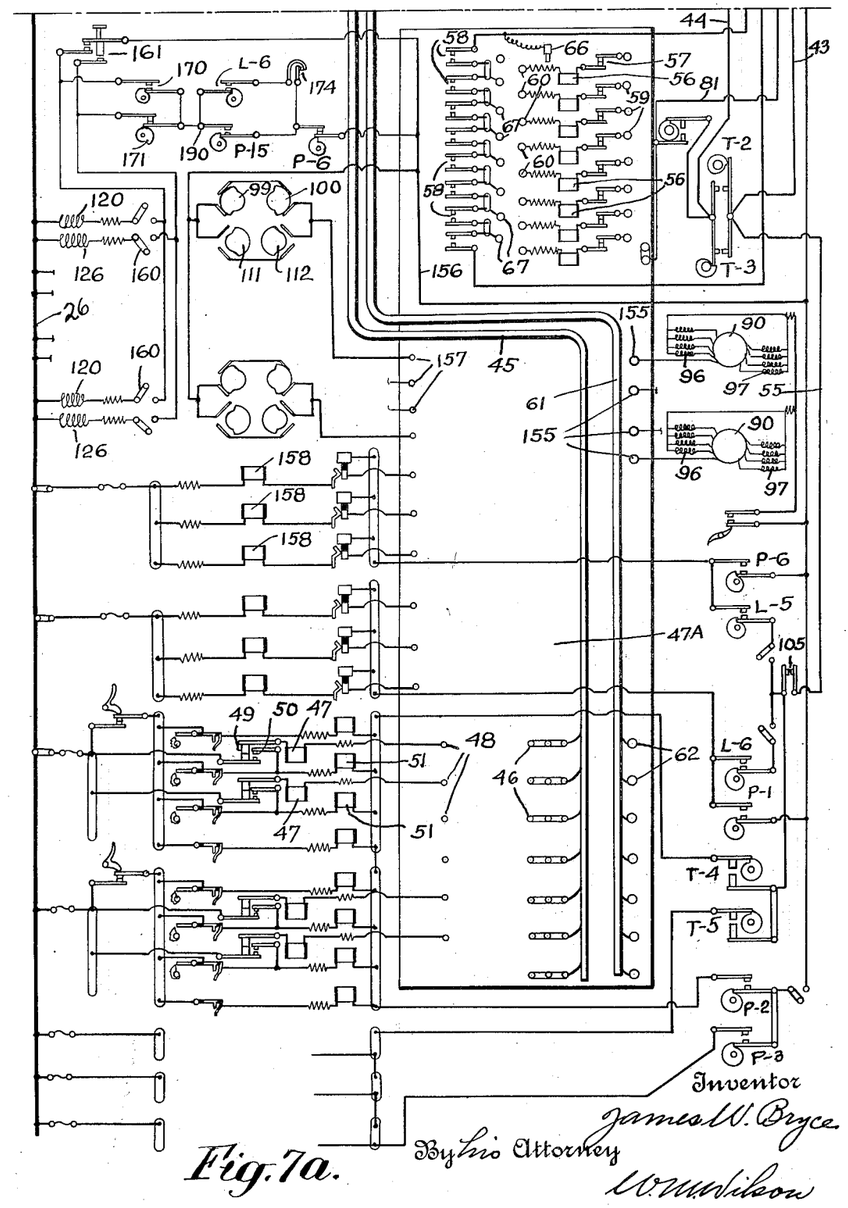

Referring against to Figs. 7 and 7a either restoring magnet 120 or 126 controlling the reading-out device which is to control group printing during total taking is energized through the closure of cam contacts P—15 shortly after the total printing operation. This reading-out commutator is thereupon restored in readiness to receive a new reading from the second card of the new group during the next listing cycle. It will be recalled that the group data from the first card of this group has already been entered into the other reading-out device and the setting is held as either contacts 170 or 171 are open to prevent reset of this device by closure of cam contact P—6. When tabulating and listing is resumed on the following group this group data from the first card is read out during the first listing cycle while the first card of the new group is passing the lower brushes 24 and the second card of the group sets up the other reading-out device whereupon the alternate operation of the reading-out devices is resumed until the group again changes.

Under certain conditions it may be desirable to hold the setting of a reading-out device so that it will not be destroyed at the end of the group printing cycle. This is provided for in the switches 160 which may be opened to prevent operation of either restoring magnet 120 or 126 in which case the setting of the reading-out device will remain until the switch 160 is closed to permit energization of the restoring magnet. It may also be desirable to efface the setting of the reading-out devices arbitrarily without reference to whether they have printed or not and without reference to the normal operation of the machine. This is provided for by the double contacts 161 controlled by a push button, one set of these contacts serving to energize the restoring magnet 120 and the other set controlling the restoring magnet 126. Depression of the push button will close both sets of contacts 161 and energize both restoring magnets 120 and 126 to efface the setting of both reading-out devices regardless of the condition or operation of their normal controlling circuits.

Figure 3:
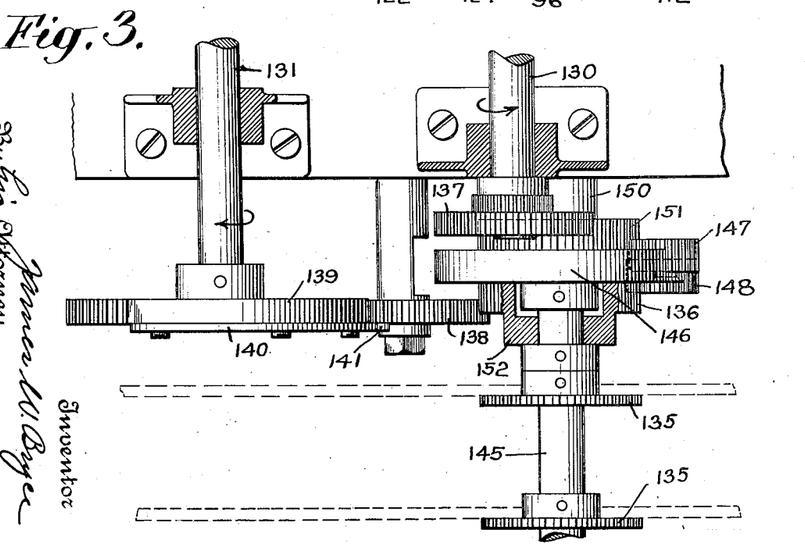
Fig. 3 is a section on line 3—3 of Fig. 1 illustrating particularly the method of driving the group indicating units from the listing and totaling shafts of the tabulator.
Figure 4:
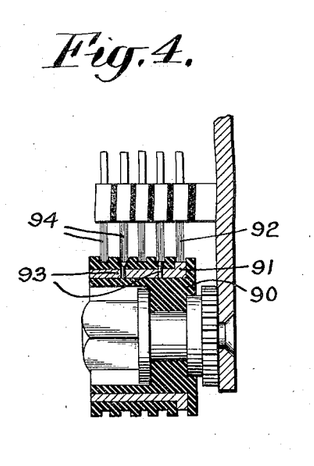
Fig. 4 is a detail section through one of the reading-in commutators of the device.

The drive of the translator mechanism for carrying out its several functions may be understood from Figs. 1 and 3. It will be recalled that the device is driven under two different conditions first during listing and second during total printing. The listing shaft of the machine which drives the printing mechanism during card feeding cycles and rotates during each tabulating cycle is shown at 130. The total printing shaft which is normally stationary and makes one revolution for total printing and reset is shown at 131. The reading-in commutator 90 is geared directly to the listing shaft 130 (see Fig. 1) as this commutator need only rotate during card feeding cycles and need not rotate during total taking cycles. The reading-out commutators 90, 99, 100, 111 and 112 must be driven, however, from both the listing and total print shafts in order that they may read out correctly for both listing and total printing operations and a differential mechanism indicated generally at 136 is provided for this purpose. The commutators of the reading-out devices are geared to each other and to a gear 135 so that all rotate concurrently. The gear 135 of which one is provided for each translating or group indicating unit is fast on shaft 145 to which is fixed a disc 146 carrying differential gears 147 and 148 these differential gears being in mesh with each other. The sleeve 150 freely mounted on the shaft 145 carries a gear 151 constantly in mesh with gear 137 fixed to the listing shaft 130. A second sleeve 152 freely mounted on the shaft 145 carries a gear 136 constantly in mesh with gear 138 which through a Geneva drive connection is driven with intermittent motion from gear 139 mounted on total print shaft 131. The gear 147 meshes with gear 151 while the gear 148 meshes with gear 136, gear 147 being free from direct enmeshment with gear 136 and gear 148 being free from direct enmeshment with gear 151, this arrangement being made possible by the offset relationship of gears 147, 148 as shown in Fig. 3. During the rotation of the listing shaft 130 the gear 151 is rotated rotating in turn the gears 147 and 148 and as the gear 136 is held stationary during listing cycles the rotation of gear 148 causes it to roll about gear 136 to rotate the disc 146 which drives the shaft 145 to operate the reading-out devices during listing cycles.

During total print cycles the listing shaft 130 is stationary while the total print shaft 131 makes one revolution. It will be recalled that the total print operation must be delayed to permit the reading-out device having the group setting from the last card of the old group to come into controlling position. The gear 139 mounted on the total print shaft is provided with teeth around two-thirds of its periphery and a half plate 140 covers the remaining one-third of the periphery. When the total print shaft 131 rotates, the listing shaft 130 now being stationary, during the first two-thirds of its revolution the gear 139 drives the gear 138 which in turn drives the gear 136 on sleeve 152 thereby rotating differential gears 148 and 147. As the gear 151 is stationary at this time the gear 147 rolls about it causing the disc 146 to rotate thereby driving the shaft 145 to operate the reading-out commutator devices. The first third of this movement is utilized to bring the reading-out commutators into proper position. During the second third of it the commutators read out and the printing devices are driven to print totals and group designations. During the last third of the revolution of the total print shaft 131 the plate 140 engages arcuate plate 141 on gear 138 and locks this gear holding the reading-out commutators stationary during reset of the accumulating devices of the machine and the locking operation continues permitting subsequent drive from the listing shaft as previously described until another total is taken. The contacts 170 and 171 described in connection with Figs. 7 and 7a are driven from the reading-out devices as shown in Fig. 1. The contacts 170 are controlled from a cam 172 driven from a gear on commutator 100 and contacts 171 are operated by a cam 173 driven from the gear on commutator 112. The cams are geared one to one with the commutators from which it follows that they are closed once every two machine cycles and the driving cams are displaced so that the contacts 170 close during one machine cycle and the contacts 171 close during the following machine cycle.

The operation has been described in connection with listing and totaling operations. If the machine is operated for tabulating alone without listing of the several items but for printing a total at the end of a group, the reading out devices will be set up for each card as in the case of listing but, of course, no printing will occur as the printing mechanism during straight tabulating is not operated. At the end of the card group one of the reading-out devices will be set up with the group data and this will effect printing of the total designating number during the printing cycle as explained above. The group designation will thereby be printed opposite the total in this type of operation.

The invention has now been described in connection with a single embodiment which is at present believed to be its preferred form. It is obvious, however, that many modifications will readily occur to those skilled in the art and it is intended that the invention be limited only as indicated by the scope of the following claims.

What is claimed is:

1. A group indicating system for a tabulator comprising data receiving means and means for entering group data therein from controlling records, means for clearing the data receiving mechanism and means for reading out the group data on a clearing operation.

2. A group indicating system for a tabulator comprising storage mechanism, means for entering group data into the storage mechanism from each controlling record and means for reading out the data from the storage mechanism with its original meaning on a total taking operation and means for selectively suppressing operation of the last named means whereby the group data may be selectively read out or suppressed on a clearing operation.

3. A group indicating system for a listing tabulator comprising translating mechanism, means for entering group data into the translating mechanism from controlling records and means for reading out the data from the translating mechanism with its original meaning on each listing operation of the tabulator.

4. A group indicating system for a tabulator comprising translating mechanism, means for entering group data into the translating mechanism from controlling records and means for reading out the data from the translating mechanism with its original meaning on each listing and totaling operation of the tabulator.

5. A group indicating system for a tabulator comprising translating mechanism, means for entering group data into the translating mechanism from controlling records and means for initiating a reading out operation of the data from the translating mechanism with its original reading and clearing the setting of the translating mechanism prior to a total taking operation.

6. A group indicating system for a tabulator comprising translating mechanism, means for entering group data into the translating mechanism from controlling records, means for reading out the group data with its original meaning on a total taking operation and means for retaining the data in the translating mechanism over the total taking operation.

7. A group indicating system for a tabulator comprising translating mechanism, means for entering group data into the translating mechanism from controlling records, means for reading the group data out of the translating mechanism with its original meaning on a total taking operation, means for clearing the translating mechanism on a total taking operation and means for selectively suppressing the operation of the last named means whereby the group data may be selectively retained or cleared on a total taking operation.

8. A group indicating system for a tabulator comprising means for analyzing records while they are in motion, entry receiving means controlled thereby to receive group data from the controlling records and means for initiating a reading out operation of the data from the entry receiving means and clearing the entry receiving means prior to a total taking operation.

9. A group indicating system for a tabulator comprising means for analyzing records while they are in motion, entry receiving means controlled thereby to receive group data from the controlling records and means for initiating a reading out operation of the data on a total taking operation and means for retaining the data in the entry receiving means after a total taking operation.

10. A group indicating system for a tubulator comprising means for analyzing records while they are in motion, entry receiving mechanism controlled thereby to receive group data from the controlling records, means for reading out the group data on a total taking operation, means for clearing the entry receiving mechanism on a total taking operation and means for selectively suppressing the operation of said last named means whereby the group data may be selectively retained or cleared on a total taking operation.

11. A group indicating system for a tabulator comprising record analyzing means for successively searching index point positions on each record of a group, entry receiving means controlled thereby to receive group data from the records, means for initiating a reading-out operation of the group data on a total taking operation and means for retaining the group data in the entry receiving means after a total taking operation.

12. A group indicating system for a tabulator comprising record analyzing means for successively searching index point positions on each record of a group, entry receiving mechanism controlled thereby to receive group data from the records, means for reading out the group data on a total taking operation, means for selectively clearing the entry receiving mechanism on a total taking operation and means for selectively suppressing the operation of said last named means whereby the group data may be selectively retained or cleared on a total taking operation.

13. A group indicating system for a tabulator having devices for receiving general entries and devices for receiving group designating entries, said system comprising record analyzing means and means controlled thereby for entering group designating data from a controlling record into the group data designation receiving devices prior to the entry of any general data from the same record.

14. A group indicating system for a cyclically operable tabulator having devices for receiving general entries and devices for receiving group designating entries, said system comprising record analyzing means and means controlled thereby for entering group designating data from a record into the group designating receiving devices during one machine cycle and means controlled by the analyzing means for entering general data from the same record into the general entry receiving devices during a subsequent machine cycle.

15. A group indicating system for a cyclically operable tabulator having devices for manifesting general data and devices for manifesting group data, said system comprising record analyzing means and means controlled thereby for receiving and storing group data during one machine cycle and means controlled by the last named means for reading out the group data and entering it into the group data manifesting devices during a subsequent machine cycle concurrently with control of the general data devices by the record analyzing means to manifest general data.

16. A cyclically operable tabulator comprising general data manifesting devices and group data manifesting devices, record analyzing means including mechanism for analyzing a record during one machine cycle to control the group data manifesting devices and mechanism for analyzing the same record during a subsequent machine cycle to control the general data manifesting devices.

17. A group indicating system for a tabulator comprising a plurality of electric circuits, analyzing means and means cooperating therewith for energizing said circuits in combinations according to group data designations on controlling records with ultimate retention of the combinations as long as a record group persists, entry receiving means and means for controlling the latter according to the combinations of energized circuits to enter the group data therein.

18. A group indicating system for a tabulator comprising record analyzing means and a plurality of electromagnetic devices, means cooperating with the analyzing means for operating the electric magnetic devices in combinations according to group data on analyzed records with ultimate retention of the combinations as long as the record group persists, and group data receiving devices controlled by the electromagnetic devices to receive group data according to the combination of electromagnetic devices operated.

19. A group indicating system for a tabulator comprising record analyzing means, a rotatable commutator having contacts thereon, brushes shiftable transversely of the commutator under control of the analyzing means to coact with different groups of contacts according to group designating data on controlling records and means conjointly controlled by the commutator and shiftable brushes to manifest the data represented by the different groups of contacts.

20. A group indicating system for a tabulator comprising record analyzing means, a commutator mechanism coacting therewith for shifting a plurality of brushes transversely of a second commutator device in combinations corresponding to group designating data on controlling records and means controlled by said second commutator device according to the combinations of shifted brushes to manifest the group designating data.

21. A group indicating system for a tabulator comprising a record analyzing device, a pair of settable devices controlled thereby from alternate records and entry receiving means alternately controlled by said settable devices.

22. A group indicating system for a tabulator comprising a record analyzing device, a pair of settable devices controlled thereby from alternate records and entry receiving means controlled alternately from said settable devices to receive an entry from one of them while the other is being set by the analyzing device.

23. A group indicating system for a tabulator comprising an analyzing device for analyzing successive records of a group, a pair of settable devices controlled thereby and set according to group data on alternate records, entry receiving means controlled alternately from said settable devices and means for restoring the settable devices after their control of the entry receiving device.

24. A group indicating system for a tabulator comprising an analyzing device for analyzing successive records of successive groups, a pair of settable devices alternately controlled thereby and set according to group data on alternate records, entry receiving means controlled alternately from said settable devices, means for restoring the settable devices after their control of the entry receiving means and means for suppressing the operation of the restoring means at the end of each record group.

25. A group indicating system for a tabulator comprising an analyzing device for analyzing successive records of successive groups, a pair of settable devices alternately controlled thereby and set according to group data on alternate records, entry receiving means controlled alternately from said settable devices, means for restoring the settable devices after their control of the entry receiving devices according to the group data of each record and record controlled means for suppressing the operation of the restoring means on a change of record group.

In testimony whereof I hereto affix my signature.

JAMES W. BRYCE.